3,752,720
METHOD OF MAKING PNEUMATIC TIRES

Wilhelm Hamacher, Bruchkobel, and Hubert Leinweber, Hanau am Main, Germany, assignors to Dunlop Limited, London, England
Filed Jan. 6, 1971, Ser. No. 104,207
Claims priority, application Germany, Jan. 15, 1970, P 20 01 706.5
Int. Cl. B29h *17/22*
U.S. Cl. 156—132                    7 Claims

ABSTRACT OF THE DISCLOSURE

A method of building a tubeless pneumatic tire, comprising a bead region reinforcement of rubberized fleece material, the fibers of which are preferentially orientated substantially perpendicularly to a tire circumference.

---

Figure 1:
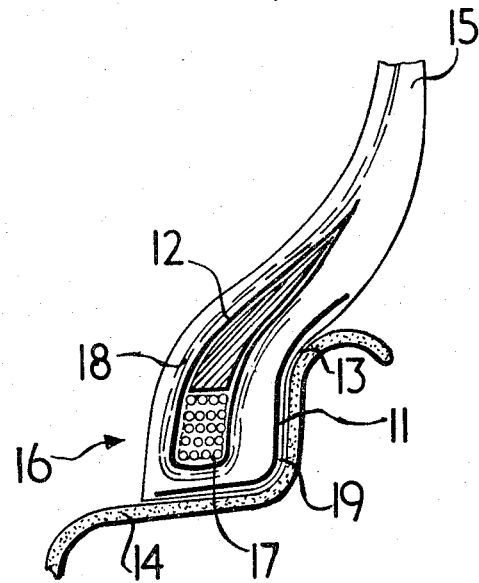

This invention relates to pneumatic tires and, in particular, to tubeless pneumatic tires having bead regions reinforced by rubberized fleece.

It is known that during the moulding and vulcanization of tires of this particular type the reinforcement e.g. a chafer strip or a bead wrapping can become damaged especially adjacent that part of the tire for engaging the wheel rim flange and the protective and/or reinforcing effect of the fleece in the finished tire is therefore reduced. The reason for this damage is that the mould exerts considerable pressure on the tire bead region and clinch area during moulding and the fibers of the fleece are unable to withstand the high local forces produced.

It is an object of the present invention to provide a tire having a fleece bead region reinforcement which substantially reduces or overcomes the above-mentioned disadvantage, the bead region of the tire furthermore being capable of withstanding rough usage e.g. during the mounting of the tire on a wheel or during the rubbing of the tire and rim.

In accordance with the invention a method of building a pneumatic tire comprises introducing into a fiber fleece a preferential orientation of the fibers of the fleece in one direction, building the fleece into the pneumatic tire as a reinforcement for a bead region, the direction of preferential orientation of the fibers of the fleece being substantially perpendicular to the tire circumference, and moulding and vulcanizing the tire.

The reinforcement e.g. a chafer strip or a bead wrapping may comprise any conventional textile tire making fiber material e.g. polyamide or polyester. In the instance when the reinforcement is a chafer strip, a layer of rubber may be provided externally of the chafer strip prior to moulding the tire. When the finished tire is mounted on a wheel this rubber layer will contact the wheel rim.

The preferential orientation may be introduced into the fleece by carding and is such as to cause a majority of the fibers to be aligned substantially in one direction, but there will be a proportion of the fibers which lie in other directions. The degree of orientation is measured by the anisotropy introduced and in the present instance, in the unrubberized condition prior to building into a tire, the fleece may have a strength in the direction which will eventually be substantially perpendicular to the tire circumference which is at least five times, preferably 10–20 times, and may be up to 30 times greater than the strength in a direction transverse to the direction of preferential orientation.

On being built into a tire bead region the fleece with fibers oriented substantially in the preferred direction can withstand the moulding pressure without any substantial damage occurring and may be stretched during vulcanization in the preferred direction to produce an increase in strength in that direction.

The elasticity of the fiber fleece is greater in a circumferential direction than in a radial direction of the tire. A tire built in accordance with the invention thus has a bead region reinforcement which is stronger in a radial direction and more elastic in a circumferential direction.

In accordance with the invention also there is provided a pneumatic tire having at least one reinforcement in a bead region of the tire comprising a rubberized fiber fleece the fibers of which have a direction of preferential orientation which is substantially perpendicular to the tire circumference.

Figure 2:
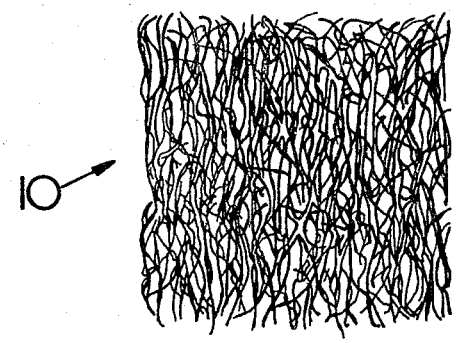

One embodiment of the invention will now be described by way of example only with reference to the accompanying drawings of which FIG. 1 shows a radial cross-section of the bead region of a tubeless tire in accordance with the invention on a wheel rim and FIG. 2 shows a diagrammatic plan view of a fiber fleece prior to rubberization and being built into a tire according to the invention.

A length of fiber fleece 10 of polyamide textile material is carded so that the fibers are preferentially oriented in one direction (top to bottom as shown in FIG. 2) and the strength in this direction is 10–20 times greater than that in the transverse direction (left to right in FIG. 2).

The length of fleece is then dipped in or otherwise impregnated with a liquid such as resorcinol formaldelyde latex solution (RFL) and dried. Rubber is then calendered on to the length of fleece, the dried RFL acting as an adhesive. Strips cut from the length of rubberized fleece may then be built into a tire as a chafer strip and/or a bead wrapping.

The tire shown in FIG. 1 has a bead region 16 which seats on a wheel rim 14 in the usual manner.

To build the bead region of this tire the bead wrapping 12 comprising a strip cut from a length of rubberized fleece is either spirally wrapped or folded around the bead core 17 and the plies 18 turned around the assembly of core and wrapping. A chafer strip 11 also comprising a strip cut from a length of rubberized fleece, is provided externally of the plies and a rubber layer 19 provided externally of the chafer strip. It is arranged that the fibers of the bead wrapping and the chafer strip are oriented preferentially perpendicularly to the tire circumference.

After the whole tire is built it is shaped and moulded and vulcanized in the conventional manner so that the components in the bead region are located substantially in the positions shown in FIG. 1 and the strip of fleece forming the chafer strip 11 is stretched in a radial direction in the bead clinch area 13.

Tires built in accordance with the invention have further advantages when compared with tires having woven or cord fabric bead reinforcements in that air-wicking and looseness of the reinforcement is less likely to occur since the open structure of the fleece had generally greater adhesion with the surrounding rubber.

Having now described our invention, what we claim is:

1. A method of building a pneumatic tire comprising introducing into a fiber fleece a preferential orientation of the fibers of the fleece in one direction, building the fleece into the pneumatic tire as a reinforcement for a bead region, the direction of preferential orientation of the fibers of the fleece being substantially perpendicular to the tire circumference, and moulding and vulcanizing the tire.

2. A method according to claim 1 wherein the reinforcement comprises a bead wrapping.

3. A method according to claim 1 wherein the reinforcement comprises a chafer strip.

4. A method according to claim 3 comprising providing a layer of rubber externally of the chafer strip prior to moulding the tire.

5. A method according to claim 1 wherein the fleece after having the preferential orientation introduced therein, is impregnated with a liquid adhesive.

6. A method according to claim 1 wherein the fleece is rubberized immediately prior to being built into the tire.

7. A method according to claim 1 wherein the fibers of the reinforcement are stretched during moulding in a direction substantially perpendicular to the tire circumference.

References Cited
UNITED STATES PATENTS 2,937,684   5/1960   Rockoff _____ 152—362 R WILLIAM A POWELL, Primary Examiner U.S. Cl. X.R.

152—362; 156—135; 161—69, 151